No. 624,942. Patented May 16, 1899.
E. A. JOHNSTON.
CORN HARVESTER.
(Application filed Apr. 28, 1897.)
(No Model.) 2 Sheets—Sheet 1.
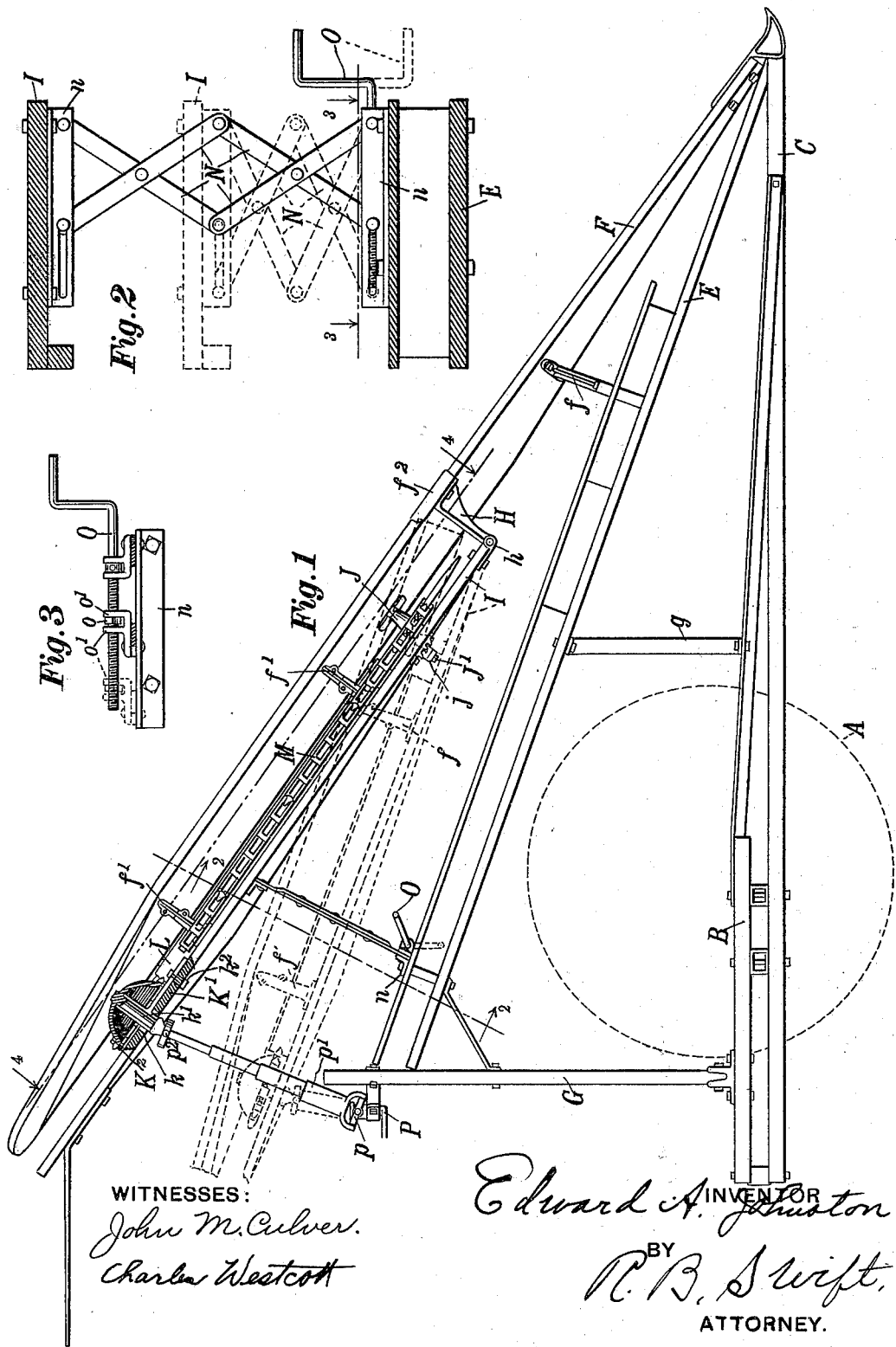
WITNESSES: INVENTOR
John M. Culver. Edward A. Johnston
Charles Westcott BY
R. B. Swift,
ATTORNEY.

No. 624,942. Patented May 16, 1899.
E. A. JOHNSTON.
CORN HARVESTER.
(Application filed Apr. 28, 1897.)
(No Model.) 2 Sheets—Sheet 2.
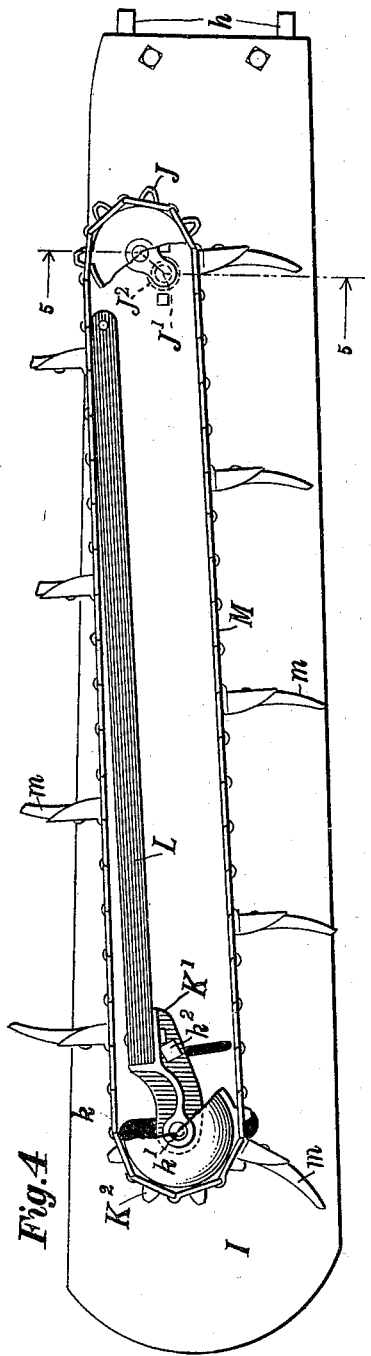
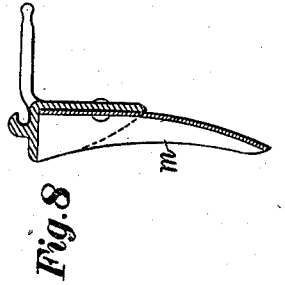
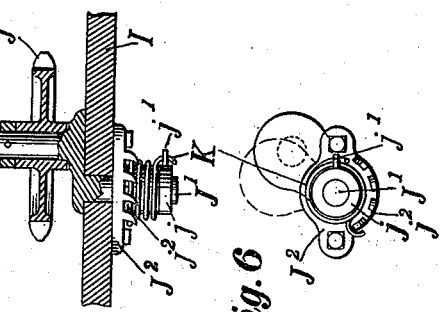
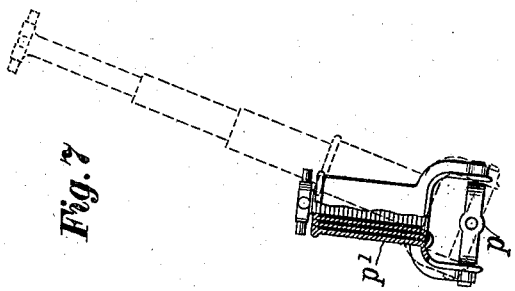
WITNESSES:
John M. Culver
Charles Westcott
Edward A. Johnston INVENTOR
BY R. B. Swift
ATTORNEY.

UNITED STATES PATENT OFFICE.

EDWARD A. JOHNSTON, OF CHICAGO, ILLINOIS, ASSIGNOR TO THE McCORMICK HARVESTING MACHINE COMPANY.

CORN-HARVESTER.

SPECIFICATION forming part of Letters Patent No. 624,942, dated May 16, 1899.

Application filed April 28, 1897. Serial No. 634,190. (No model.)

*To all whom it may concern:*

Be it known that I, EDWARD A. JOHNSTON, a citizen of the United States, residing at Chicago, in the county of Cook and State of Illinois, have invented a new and useful Improvement in Corn-Harvesting Machines, of which the following is a specification.

My invention relates to improvements in machines for harvesting corn in which prongs project ahead of the machine to straighten and guide the corn rearwardly; and the objects of my improvements are, first, to provide a tops-forwarding device that will engage with the stalks of corn and carry them rearward; second, to form this forwarding device so that it can be adjusted at its delivery end for tall or short corn; third, to provide a strong and simple device to sustain this adjustable tops-forwarder, and, fourth, to provide means whereby the tops-forwarder can be swung out of the corn passage-way at its delivery end. I attain these objects by the mechanism illustrated in the accompanying drawings, in which—

Figure 1 is a side view of so much of a corn-harvesting machine as is necessary to show my invention. Fig. 2 is a view on line 2 2 of Fig. 1, the tops-forwarding chain and its shield above not being shown. Fig. 3 is a view of the threaded crank that adjusts the tops-forwarding device up and down on line 3 3 of Fig. 2. Fig. 4 is a top view of the tops-forwarding chain on line 4 4 of Fig. 1. Fig. 5 is a view of the lower sprocket of the tops-forwarding chain and its spring on line 5 5 of Fig. 4. Fig. 6 is the bottom view of the same. Fig. 7 is a view in full lines of the telescoping shaft that transmits the power from the moving part of the machine to the tops-forwarding chain, and in dotted lines this shaft is shown extended. Fig. 8 is a sectional view of one of the links of the top part of the chain.

Similar letters refer to similar parts throughout the several views.

The main wheel A of the machine is shown in dotted lines, and it is positioned in the main frame B. The binding mechanism of the machine is not shown. From this binding mechanism on each side of the row prongs are projected forward. These prongs are made up of the sills C, the center diagonal brace and guide E, and the tops-guide F. The guide and brace E is supported at the rear end by the upright post G and braced in the center by the shorter post $g$. The tops-guide F is attached at its point to the sills C and to the brace and guide E. The short post $f$ braces and supports the front end of the tops-guide F. The front end of this guide is thus rigidly supported; but the rear end is pivoted on a hanging bracket H, that is fastened to tops-guide board F. This rear portion is formed of a board I, that forms a support for the front sprocket-wheel J and for the rear sprocket $K^2$. The front sprocket is mounted on a swinging crank-stud $J'$. This stud is pivoted in the box $J^2$, that is bolted to the lower side of the board I. A collar $j$ is fitted on the lower end of the swinging stud $J'$, and the pin $j'$ fastens it to the stud and projects far enough so that a spring K as it coils around the head of the box $J^2$ can be hooked to it. The other end of the spring is fastened in the notches $j^2$, that are rigidly positioned on a flange on the box $J^2$. It is thus plain that the tendency of the spring is to throw the crank-stud around in the direction in which the stress of the spring is exerted. On the upper end of the crank-stud the sprocket-wheel J is placed. At the rear end of the board I is a transverse slot $k$, through which the stud $k'$ of the sprocket-wheel $K^2$ projects. A radius-bar L is pivoted on the board I near the sprocket-wheel J, and its face is tangential to the face of the sprocket-wheel. This bar extends along the board, and to its rear end is bolted the box $K'$, that serves as a bearing for the stud $k'$ of the rear sprocket $K^2$. A bolt $k^2$ extends through this box and a transverse slot in the board I and serves to fasten the radius-bar in any position desired. The sprocket-wheel $K^2$ is made with a crown, and the box $K'$ is extended beneath this crown, so as to give a long bearing to the stud $k'$ of the sprocket-wheel $K^2$. About these sprocket-wheels the tops-forwarding chain M is placed. The spring of the lower sprocket is unfastened and the sprocket swung around, so that the chain can be placed upon it. The spring is then tightened, and the sprocket thus serves the double purpose of supporting and guiding the chain and tightening it. The chain is formed of links, which at desired distances along its length are fitted with longer fingers, which extend practically across the corn passage-way. These fingers are formed of sheets of metal $m$, that are bent to form a half-oval and then fitted to the flange of the links. They thus present round surfaces to the corn, over which the ears slip without being torn from the stalks. The rear end of the tops-forwarding chain is moved into and out of the path of the corn by loosening the bolt $k^2$ and swinging the radius-bar L in and out, the bolt moving in the transverse slot in the board I. When it has been placed in the proper position for the variety of corn in which the machine is working, the bolt $k^2$ is tightened, thus fastening the parts in position.

The rear end of the tops-guide F is supported on the posts $f'$, which are bolted to the board I. The board I is pivoted to the hanging bracket H by the pivot-casting $h$, and when the tops-forwarding device is raised and lowered at its delivery end on this pivot it is plain that the tops-guide F will be divided, and therefore a shield $f^2$ is attached to the board F and covers the opening that is thus formed. The board F is inclined, so that the ears of corn may more readily slip from it into the corn passage-way. The rear end of the board F is, as shown in Fig. 1, deflected from the general directions of the board, so as to be brought more nearly to a horizontal, and thus allow the corn to pass beyond it after being released by the forwarding-chain M. The board also shields the tops-forwarding chain from the corn, and the edge of the board F, with that of the board I, forms a stripper for the teeth of the chain. The chain, with the sprocket-wheel $K^2$, is swung on the radius-bar L, so as to be almost entirely removed at its rear end from the corn passage-way. It thus carries the tops more or less forcibly rearward, as is desired. When the wind blows strongly from the rear, thus tending to blow the tops of the corn forward, the chain must be swung into the passage-way, so as to act forcibly against the tops of the corn. When, however, the corn tends to fall to the rear and on calm days, the chain can be swung out of the stalk passage-way. The tops-forwarding device has also another movement—that of up and down. Its rear end is supported by bars that are joined to form lazy-tongs. Pairs of bars N are pivoted together at their centers and then to each other. In the drawings two pairs are shown. One of the bars is pivoted to the board I at its end and another to the guide E. A slotted flange $n$ is fastened to the board E and a similar one to the board I. A pin from the other arm on each end of the lazy-tongs works in these slots. A threaded crank O is fastened to the arm of the lazy-tongs that is pivoted to the slotted flange $n$, and threaded nut $o$ is placed upon it and between flanges $o'$, that are fastened to the free arm of the lazy-tongs. It is plain then that when the crank is turned the tongs will be extended or shut up and the tops-forwarding device raised or lowered, so as to conform to the various heights of corn. It has been found in practical operation of the machine in the field that when the corn is lodged and tangled the prongs will pass beneath it and partially straighten it; but if their pitch is too great they will pull the roots of the corn from the ground and the machine will soon become clogged. In conditions of this kind the rear of the tops-forwarding device must be lowered, so as to lessen the height to which the corn must be straightened. The tops-forwarding device will then carry the lodged corn that hangs across the prong into the binder, and the onward motion of the machine will carry the stalks that are wrapped over the prong to the rear, and they will be discharged without interfering with the operation of the machine.

Power is transmitted to the sprockets upon which the tops-forwarding chain M is mounted by means of a telescoping shaft and gimbal connection. The part P of the machine is in constant rotation. It is connected by a gimbal-ring $p$, that has attached to it a square extension $p'$, and fitted into this is another extension and into this still another, and finally this telescoping shaft is connected by gimbal-ring $p^2$ with the sprocket-wheel $K^2$. Power is thus transmitted to the tops-forwarding device, and because of the flexibility of the coupling connection the tops-forwarding chain can be swung in and out of the corn passage-way, and the whole tops-forwarding device can be raised and lowered.

Attention is called to the fact that when the tops-forwarding device is in tangled corn the deflection of the delivery end on the tops-guide F brings the board more nearly to a horizontal, and thus makes the delivery of corn that may hang upon the prong more easy than will be the case were it continued in the direction of the main body of the board.

Having now described my invention, what I desire to secure by Letters Patent is—

1. The combination in a corn-harvesting machine, a forwardly-projecting prong that slants rearwardly and upwardly, the tops-guide of which is jointed and the rear part pivoted to the front, and means for adjusting the delivery end up and down.

2. In combination in a corn-harvesting machine, a forwardly-projecting prong divided into two parts, the front part of which is attached to the machine and the rear part of which is pivoted to the front part, a chain mounted on the pivoted rear part and shielded from the corn, the rear end of which chain is adjustable into and out of the corn passage-way, substantially as and for the purpose specified.

3. In combination in a corn-harvesting machine, a forwardly-projecting prong that is divided into two parts, the front part of which is attached to the machine and the rear part of which is pivoted to the front part, a chain mounted on sprockets on the rear part and shielded from the corn, the rear sprocket being mounted on a radius-bar that is practically tangential with the front sprocket, a flexible connection by which power is transmitted from the moving part of the machine to the swinging sprocket and means for adjusting and fastening the sprocket in any desired position, substantially as and for the purpose specified.

4. The combination in a corn-harvesting machine, a forwardly-projecting prong, a tops-forwarding device pivoted to the prong and consisting of a board upon which sprocket-wheels are mounted, a chain upon these sprocket-wheels, one of which sprocket-wheels is mounted upon a pivoted crank, a spring upon the crank and flexible connections transmitting power from the moving parts of the machine to the tops-forwarding device.

5. In combination in a corn-harvesting machine, a tops-forwarding guide that is pivoted at its receiving end to one of the prongs of the machine and which is adjustable at its delivery end in a vertical plane, a chain mounted on the guide so that its teeth sweep the stalk passage-way, means for adjusting the chain out of and into the stalk passage-way, and means for adjusting the tops-guide, substantially as specified.

6. The combination in a corn-harvesting machine, with a forwardly-projecting prong that slants rearwardly and upwardly, the tops-guide of which is jointed, and has its rear part pivoted to the front part, of a rearwardly-traveling corn-engaging device, and means for adjusting the tops-guide and the corn-engaging device up and down.

EDWARD A. JOHNSTON.

Witnesses:
JOHN W. PRIDMORE,
BERT R. BENJAMIN.